United States Patent
Park et al.

(10) Patent No.: US 11,095,932 B2
(45) Date of Patent: Aug. 17, 2021

(54) REMOTE CONTROL DEVICE AND CONTROL METHOD THEREOF

(71) Applicant: SAMSUNG ELECTRONICS CO., LTD., Suwon-si (KR)

(72) Inventors: Hyo-seung Park, Seoul (KR); Min-hyung Kim, Seoul (KR); Ga-min Park, Seoul (KR); So-yon You, Seoul (KR); Sang-joon Lee, Seoul (KR); Jun-woo Lee, Seoul (KR); Kyung-hwa Jung, Anyang-si (KR); Seong-wook Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/765,651

(22) PCT Filed: Sep. 12, 2018

(86) PCT No.: PCT/KR2018/010659
§ 371 (c)(1),
(2) Date: May 20, 2020

(87) PCT Pub. No.: WO2019/103292
PCT Pub. Date: May 31, 2019

(65) Prior Publication Data
US 2020/0304746 A1    Sep. 24, 2020

(30) Foreign Application Priority Data
Nov. 22, 2017  (KR) .......................... 10-2017-0156292

(51) Int. Cl.
*H04N 21/422*  (2011.01)
*G06F 3/01*    (2006.01)

(52) U.S. Cl.
CPC ....... *H04N 21/42204* (2013.01); *G06F 3/011* (2013.01); *G06F 3/017* (2013.01); *H04N 21/422* (2013.01); *H04N 21/42222* (2013.01)

(58) Field of Classification Search
CPC ................................................ H04N 21/42204
See application file for complete search history.

(56) References Cited

U.S. PATENT DOCUMENTS 7,095,456 B2 *  8/2006  Nakajima .............. G08C 19/28
                                                         348/734
9,024,726 B2    5/2015  Park et al.
(Continued)

FOREIGN PATENT DOCUMENTS

JP      4220210       2/2009
JP      2011-071902   4/2011
(Continued)

OTHER PUBLICATIONS

International Search Report for PCT/KR2018/010659 dated Dec. 18, 2018, with English Translation, 4 pages.
(Continued)

*Primary Examiner* — Paulos M Natnael
(74) *Attorney, Agent, or Firm* — Nixon & Vanderhye, P.C.

(57) ABSTRACT

A remote control device and a control method thereof are provided. The remote control device for controlling an external display apparatus includes: a communication unit configured to communicate with the external display apparatus; a sensor configured to detect a state of the remote control device; a display; and a processor configured to receive information on a content currently displayed by the external display apparatus through the communication unit, and to control the display to display a UI including a plurality of UI elements for controlling the external display
(Continued)

apparatus, based on the information on the content and the state of the remote control device.

15 Claims, 13 Drawing Sheets

(56) References Cited

U.S. PATENT DOCUMENTS

| | | | |
|---|---|---|---|
| 9,076,322 B2* | 7/2015 | Patel | G08C 17/02 |
| 9,280,211 B2 | 3/2016 | Shih et al. | |
| 9,357,250 B1* | 5/2016 | Newman | H04N 21/4126 |
| 10,635,373 B2* | 4/2020 | Kim | G06F 3/14 |
| 10,770,067 B1* | 9/2020 | Prasad | H04N 21/42225 |
| 2011/0211131 A1* | 9/2011 | Kikuchi | G06F 1/3218 |
| | | | 348/734 |
| 2011/0254723 A1* | 10/2011 | Tsurumoto | G08C 17/00 |
| | | | 341/176 |
| 2012/0239396 A1 | 9/2012 | Johnston et al. | |
| 2013/0127726 A1 | 5/2013 | Song et al. | |
| 2015/0100322 A1* | 4/2015 | Lee | H04N 21/42209 |
| | | | 704/275 |
| 2015/0193103 A1 | 7/2015 | Moon et al. | |
| 2017/0026700 A1* | 1/2017 | Choi | H04N 5/4403 |
| 2017/0070767 A1 | 3/2017 | Heeter et al. | |
| 2017/0110005 A1* | 4/2017 | Yang | H04N 21/42204 |
| 2018/0091845 A1* | 3/2018 | Lee | H04N 21/42204 |
| 2019/0012137 A1* | 1/2019 | Lim | H04N 21/431 |

FOREIGN PATENT DOCUMENTS

| | | |
|---|---|---|
| KR | 10-0612997 | 8/2006 |
| KR | 10-2009-0029399 | 3/2009 |
| KR | 10-2012-0075952 | 7/2012 |
| KR | 10-2013-0057287 | 5/2013 |
| KR | 10-2013-0080750 | 7/2013 |
| KR | 10-2013-0121379 | 11/2013 |
| KR | 10-2015-0040445 | 4/2015 |
| KR | 10-2015-0081708 | 7/2015 |

OTHER PUBLICATIONS

Written Opinion of the ISA for PCT/KR2018/010659 dated Dec. 18, 2018, with English Translation, 10 pages.

* cited by examiner

FIG. 8
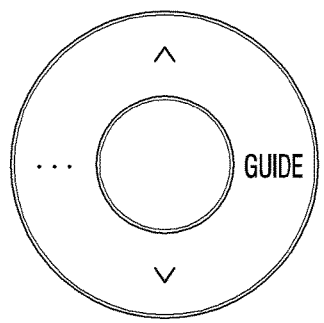
LIVE TV
UP: CHANNEL UP
DOWN: CHANNEL DOWN
RIGHT: EPG
LEFT: OPTION
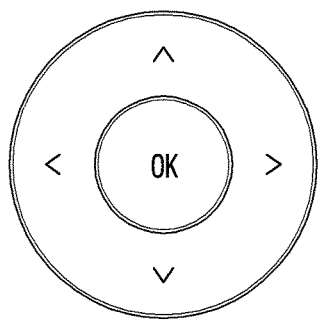
MENU SCREEN/APP
UP, DOWN, LEFT, RIGHT:
FOUR DIRECTIONS
CENTER: OK
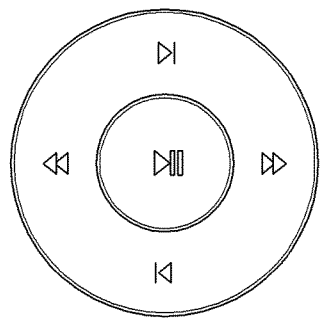
VOD
LEFT AND RIGHT:
FAST FORWARD AND REWIND
UP AND DOWN: SKIP
CENTER: PLAY/PAUSE
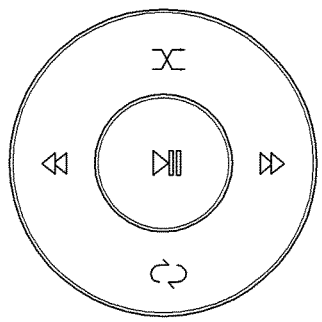
SPEAKER/SOUND DEVICE
UP: SHUFFLE
DOWN: REPEAT
RIGHT: NEXT SONG
LEFT: PREVIOUS SONG
CENTER: PLAY/PAUSE

REMOTE CONTROL DEVICE AND CONTROL METHOD THEREOF

This application is the U.S. national phase of International Application No. PCT/KR2018/010659 filed Sep. 12, 2018 which designated the U.S. and claims priority to KR Patent Application No. 10-2017-0156292 filed Nov. 22, 2017, the entire contents of each of which are hereby incorporated by reference.

TECHNICAL FIELD

Apparatuses and methods consistent with exemplary embodiments relate to a remote control device and a control method thereof, and more particularly, to a remote control device which changes a user interface (UI) thereof according to a type of a content reproduced on an external display apparatus connected thereto, and a state of the remote control device, and a control method thereof.

BACKGROUND ART

As a related-art method of interfacing between a display apparatus and a user, a remote control device has been widely used.

With the development of technology, the remote control device has various functions and various UIs and buttons on the remote control device are used to enhance user's convenience.

However, various UIs displayed on the remote control device are the same regardless of a screen which is currently viewed by a user, and make it difficult for the user to operate a display apparatus by using the remote control device. In addition, the UI is displayed in the same state regardless of how the user grips the remote control device. Accordingly, when the user improperly grips the remote control device, the user should grip the remote control device properly, which may cause inconvenience.

SUMMARY

One or more exemplary embodiments provide a remote control device which can enhance user's operation convenience, and a control method thereof.

According to an aspect of an exemplary embodiment, there is provided a method for displaying a UI of a remote control device for controlling an external display apparatus, the method including: receiving information on a content currently displayed by the external display apparatus from the external display apparatus; detecting a state of the remote control device; and displaying a UI including a plurality of UI elements for controlling the external display apparatus, based on the information on the content and the state of the remote control device.

In this case, the receiving the information may include receiving at least one of type information of the content currently displayed by the external display apparatus, and identification information of the content.

In this case, the displaying the UI may include determining a plurality of UI elements corresponding to the type information on the content, and displaying a UI including the determined plurality of UI elements.

The displaying the UI may include determining arrangements of the UI elements to correspond to the detected state of the remote control device, and displaying the UI.

In this case, the detecting may further include recognizing an upper end of the remote control device before the remote control device is gripped by a user, and the displaying may include determining arrangements of the UI elements with reference to the upper end of the remote control device, and displaying the UI.

In this case, the displaying the UI may include, when it is detected that the remote control device is gripped by the user, displaying the UI.

The method of may further include: when the external display apparatus detects a user with the microphone of the remote control device being inactivated, receiving a trigger signal from the external display apparatus; and, in response to the trigger signal, activating the microphone.

The method may further include: activating an LED in response to the trigger signal; and inactivating the LED when a predetermined time elapses after the trigger signal is received.

The method may further include, when communication between the remote control device and the external display apparatus is disconnected, removing the plurality of UI elements, and displaying an indicator indicating an inactive state of the microphone.

According to another aspect of an exemplary embodiment, there is provided a remote control device for controlling an external display apparatus, the remote control device including: a communication unit configured to communicate with the external display apparatus; a sensor configured to detect a state of the remote control device; a display; and a processor configured to receive information on a content currently displayed by the external display apparatus through the communication unit, and to control the display to display a UI including a plurality of UI elements for controlling the external display apparatus, based on the information on the content and the state of the remote control device.

In this case, the communication unit may be configured to receive at least one of type information of the content currently displayed by the external display apparatus, and identification information of the content.

The processor may be configured to determine a plurality of UI elements corresponding to the type information on the content, and to control to display a UI including the determined plurality of UI elements on the display.

The processor may be configured to determine arrangements of the UI elements to correspond to the state of the remote control device detected through the sensor, and to control to display the UI on the display.

The sensor may be configured to recognize an upper end of the remote control device before the remote control device is gripped by a user, and the display may be configured to determine arrangements of the UI elements with reference to the upper end of the remote control device, and to display the UI.

In this case, the processor may be configured to, when it is detected that the remote control device is gripped by the user, control to display the UI on the display.

The remote control device may further include a microphone, and the communication unit may be configured to, when the external display apparatus detects a user with the microphone of the remote control device being inactivated, receive a trigger signal from the external display apparatus, and the processor may be configured to, in response to the trigger signal, to activate the microphone.

In this case, the remote control device may further include an LED, and the processor may be configured to control to activate the LED in response to the trigger signal, and to control to inactivate the LED when a predetermined time elapses after the trigger signal is received.

When communication between the remote control device and the external display apparatus is disconnected, the processor may be configured to remove the plurality of UI elements, and to display an indicator indicating an inactive state of the microphone.

The state of the remote control device may include at least one of an angle of the remote control device formed with respect to the surface of the earth, and a direction toward the remote control device faces.

According to another aspect of an exemplary embodiment, there is provided a control method of an external display, the method including: displaying a currently reproduced content; detecting a user; transmitting information to a communication unit of a remote controller; and transmitting information on the currently reproduced content and user detection information to the communication unit of the remote controller.

According to another aspect of an exemplary embodiment, there is provided an external display apparatus, including: a display configured to display a currently reproduced content; a sensor configured to detect a user; a communication unit configured to transmit information to a communication unit of a remote controller; and a processor configured to transmit information on the currently reproduced content, displayed on the display, and user detection information detected by the sensor, to the communication unit of the remote controller.

According to various embodiments, the remote control device may provide a UI corresponding to a content currently viewed by a user to the user. In addition, the remote control device detects a state before the remote control device is gripped by a user, and provide a UI in the normal direction regardless of a user's posture.

BRIEF DESCRIPTION OF THE DRAWINGS

FIGS. 5A, 5B, 5C, 5D, 6A, 6B, 6C, 7A, 7B, 8, 9A, 9B, 9C, 10A, 10B, and 10C are views to illustrate an operation of the remote control device according to various embodiments;

DETAILED DESCRIPTION OF EXAMPLE EMBODIMENTS

Figure 1:
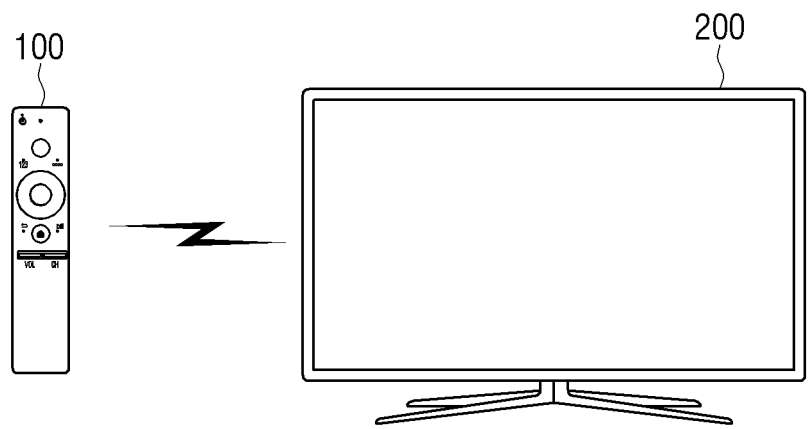
FIG. 1 is a view illustrating a system including a remote control device and an external display apparatus according to an embodiment.

Exemplary embodiments of the present disclosure will be described herein below with reference to the accompanying drawings. However, various exemplary embodiments of the present disclosure are not limited to the specific embodiments and should be construed as including modification, equivalent and/or alternative of exemplary embodiments of the present disclosure. In the explanation of the drawings, similar reference numerals are used for similar elements.

The terms "have", "may have", "include", and "may include" used in the exemplary embodiments of the present disclosure indicate the presence of corresponding features (for example, elements such as numerical values, functions, operations, or parts), and do not preclude the presence of additional features.

The terms "A or B," "at least one of A or/and B," or "one or more of A or/and B" used in the exemplary embodiments of the present disclosure include all possible combinations of items enumerated with them. For example, "A or B," "at least one of A and B," or "at least one of A or B" means (1) including at least one A, (2) including at least one B, or (3) including both at least one A and at least one B.

The term such as "first" and "second" used in various exemplary embodiments may modify various elements regardless of an order and/or importance of the corresponding elements, and does not limit the corresponding elements. These terms may be used for the purpose of distinguishing one element from another element.

It will be understood that when an element (for example, a first element) is "(operatively or communicatively) coupled with/to" or "connected with" another element (for example, a second element), the element may be directly coupled with/to another element, and there may be an intervening element (for example, a third element) between the element and another element. To the contrary, it will be understood that when an element (for example, a first element) is "directly coupled with/to" or "directly connected to" another element (for example, a second element), there is no intervening element (for example, a third element) between the element and another element.

The expression "configured to (or set to)" used in various exemplary embodiments of the present disclosure may be replaced with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device. Hereinafter, the present disclosure will be described in detail with reference to the accompanying drawings.

FIG. 1 is a view to illustrate a system for communicating between a remote control device 100 and an external display apparatus 200 according to an embodiment.

Referring to FIG. 1, the communication system includes the remote control device 100 and the external display apparatus 200. In this case, although it is illustrated that the remote control device 100 is implemented in the form of a remote controller provided with a display, the remote control device 100 is not limited thereto, and may be implemented in various forms such as a cylindrical device, a smart phone, a wearable device, a tablet personal computer (PC), or the like. In addition, the external display apparatus 200 may be implemented by using a smart TV, but the external display apparatus 200 is not limited thereto and may be implemented by using various apparatuses performing a display function, such as a monitor, a laptop PC, a tablet PC, a projector, an electronic picture frame, a smart phone, a kiosk, or the like.

The external display apparatus 200 may detect a user through various sensors. For example, the external display apparatus 200 may detect the approach or existence of a user by using sensors such as a proximity sensor or a camera.

When the external display apparatus 200 detects the user, the external display apparatus 200 may transmit a trigger signal for activating the remote control device to the remote control device 100. In this case, the trigger signal may include a control command to activate some elements (for example, a microphone, a display) of the remote control device, and also, may display information on a content which is currently displayed by the external display apparatus 200.

The remote control device 100 may activate some elements (for example, a microphone, a display) in response to the trigger signal transmitted by the external display apparatus 200. In addition, the remote control device 100 may drive a light emitting diode (LED) to inform the user of the location of the remote control device 100. In this case, the remote control device 100 may provide an acoustic feed such as a voice message or a tactile feedback such as haptic, as well as the visual feedback such as the LED. In addition, when a predetermined time elapses after the trigger signal was received, the remote control device 100 may stop driving the LED.

The remote control device 100 may detect an event for displaying a UI or changing a UI. In this case, the event for displaying a UI may include an event in which the remote control device 100 is gripped by a user, an event in which a trigger signal is received, an event for turning on the external display apparatus 200, an event in which a content or a screen displayed on the external display apparatus is changed, or the like.

When the event for displaying or changing the UI is detected, the remote control device 100 may determine and display a UI including a plurality of UI elements for controlling the external display apparatus 200, based on information on a content received from the external display apparatus 200 and a state of the remote control device 100. The state of the remote control device 100 may be at least one of an angle of the remote control device 100 with respect to the surface of the earth, and a direction toward which the remote control device 100 faces, but is not limited thereto.

Specifically, the remote control device 100 may determine a type of a UI based on information on a content received from the external display apparatus 200.

Figure 2A:
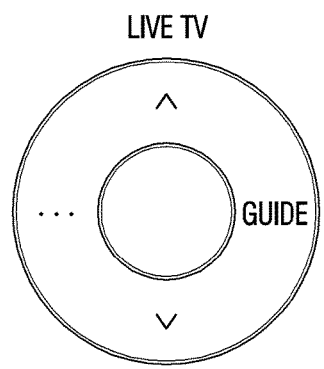
FIGS. 2A and 2B are views to illustrate a UI change of the remote control device according to an embodiment.
Figure 2B:
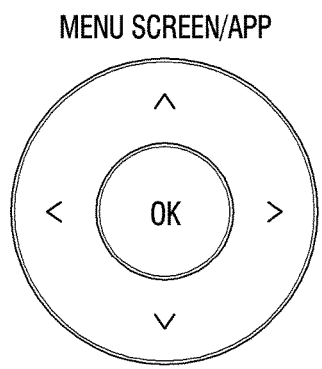

For example, when information on a live TV is received from the external display apparatus 200 as type information of a currently reproduced content, the remote control device 100 may display a UI including four-direction UI elements mapped onto functions for controlling a live TV as shown in FIG. 2(a). In another example, when information on a menu screen/APP is received from the external display apparatus 200 as type information of a currently reproduced content, the remote control device 100 may display a UI including four-direction UI elements mapped onto functions for controlling a menu screen/APP as shown in FIG. 2(b).

In addition, the remote control device 100 may determine arrangements and display directions of UI elements according to a state of the remote control device 100 detected based on various sensors. For example, the remote control device 100 may recognize an upper end of the remote control device before the remote control device 100 is gripped by the user, and may determine arrangements of UI elements with reference to the upper end of the remote control device 100 and may display the UI.

Figure 3:
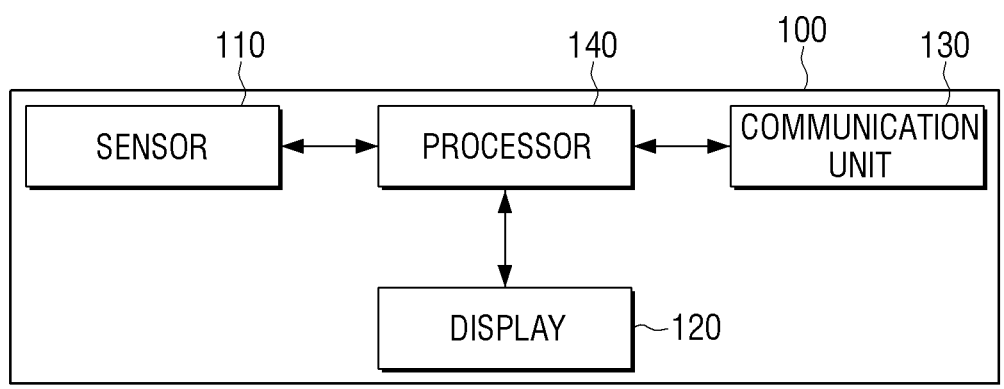
FIGS. 3 and 4 are block diagrams illustrating a configuration of the remote control device according to various embodiments.

In addition, when communication between the remote control device 100 and the external display apparatus 200 is disconnected, the remote control device 100 may remove the plurality of UI elements, and may display an indicator indicating that a microphone is inactivated. In this case, when a predetermined time elapses, the remote control device 100 may remove the display of the indicator and may inactivate the microphone and the display. FIG. 3 is a view to illustrate a configuration of the remote control device 100 according to an embodiment. Referring to FIG. 3, the remote control device 100 may include a sensor 110, a display 120, a communication unit 130, and a processor 140. Some of the elements illustrated in FIG. 3 may be omitted or changed, or some elements may be added according to implementation of the remote control device 100.

The sensor 110 may detect a state of the remote control device 100. In particular, the sensor 110 may detect a state of the remote control device 100 before the remote control device 100 is gripped. In addition, the sensor 110 may detect a change in the state of the remote control device 100 and may detect that the remote control device 100 is gripped by the user. The display 120 may display a UI including a plurality of UI elements based on information on a content which is currently reproduced by the external display apparatus 200. The communication unit 130 may be configured to be connected with a communication unit of the external display apparatus 200 and to communicate therewith. In particular, the communication unit 130 may receive information transmitted from the external display apparatus 200. For example, the communication unit 130 may receive type information or identification information on a content which is currently reproduced by the external display apparatus 200 from the external display apparatus 200. In addition, the communication unit 130 may receive a trigger signal which is transmitted by the external display apparatus 200 when a sensor of the external display apparatus 200 detects a current user.

The processor 140 may be configured to control an overall operation of the remote control device 100.

According to an embodiment, the processor 140 may determine a state of the remote control device 100 before the remote control device 100 is gripped by the user, based on information detected by the sensor 110. The processor 140 may detect which portion of the remote control device 100 is positioned relatively higher than the other portions from the surface of the earth, through the sensor 110, and may determine the state of the remote control device 100 according to the detected information. In addition, the processor 140 may receive information on a content which is currently reproduced by the external display apparatus 200 from the external display apparatus 200 through the communication unit 130.

The processor 140 may control the display 120 to display a plurality of UI elements for controlling the external display apparatus 200, based on the received information on the content and the state of the remote control device 100.

Figure 4:
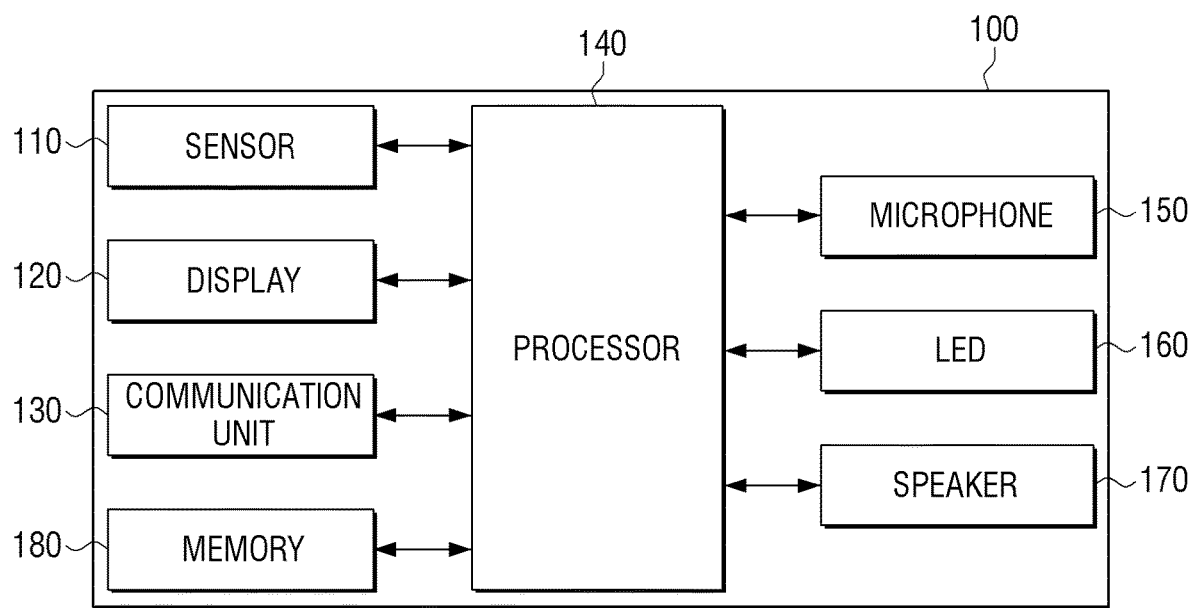

FIG. 4 is a view to illustrate the configuration of the remote control device 100 according to an embodiment.

Referring to FIG. 4, the remote control device 100 may further include a microphone 150, an LED 160, a speaker 170, and a memory 180, in addition to the sensor 110, the display 120, the communication unit 130, and the processor 140 described above. The sensor 110 is a sensor for detecting the state of the remote control device 100, and may be implemented by using a gyro sensor, an acceleration sensor, or a geomagnetic sensor, but is not limited thereto.

The display 120 may be implemented by using a liquid crystal display (LCD), for example, and according to circumstances, may be implemented by using a cathode-ray tube (CRT), a plasma display panel (PDP), organic light emitting diodes (OLEDs), transparent OLEDs (TOLEDs), or the like. In addition, the display 120 may be implemented in the form of a touch screen capable of detecting a user's touch operation. The touch screen may have not only a display function but also a function of detecting a touch input position, a touched area, and a touch input force. In addition, the touch screen may have a function of detecting not only a real touch but also a proximity touch. In addition, the communication unit 130 may include various communication chips for supporting wired or wireless communication. For example, the communication unit 130 may include various communication chips such as a WiFi chip, a Bluetooth chip, a wireless communication chip, or the like. The WiFi chip and the Bluetooth chip communicate in a WiFi method and a Bluetooth method, respectively. The wireless communication chip refers to a chip which communicates according to various communication standards such as IEEE, Zigbee, $3^{rd}$ Generation (3G), $3^{rd}$ Generation Partnership Project (3GPP), Long Term Evolution (LTE), and the like. In addition, the communication unit 130 may further include a near field communication (NFC) chip operating in an NFC method. The NFC chip refers to a chip which operates in an NFC method using a band of 13.56 MHz from among various RF-ID frequency bands such as 135 kHz, 13.56 MHz, 433 MHz, 860-960 MHz, and 2.45 GHz.

The microphone 150 may receive an external sound (for example, a user voice) of the remote control device 100, and may amplify the external sound and may transmit the amplified sound to an audio signal processor (or processor) when necessary.

The LED 160 is an element for emitting light, and may be disposed outside the remote control device 100. In particular, when a trigger signal is received from the external display apparatus 200, the LED 160 may be activated under the control of the processor 140, and may emit light in a specific pattern. Although the LED 160 has been described as a configuration for emitting light in the above-described embodiment, this is merely an embodiment, and the LED 160 may be implemented by using another configuration for emitting light.

The speaker 170 may output information necessary for the user in the form of an audio through the processor 140. For example, when a trigger signal is received from the external display apparatus 200, the speaker 170 may output a notification message or output a beep sound.

The memory 180 may store various data for the overall operation of the remote control device 100, such as programs for processing or controlling the processor 140. The memory 180 may store a plurality of application programs (or applications) running in the remote control device 100, data for the operation of the remote control device 100, and instructions. At least a portion of the application programs may be downloaded from an external server through wireless communication. In addition, at least a portion of the application programs may exist on the remote control device 100 at the time of releasing for basic functions. The application programs may be stored in the memory 180, and may be driven by the processor 140 to perform the operations (or functions) of the remote control device 100.

The memory 180 may be, hardware-wise, a storage medium of at least one type of a flash memory type, a hard disk type, a solid state disk (SSD) type, a silicon disk drive (SDD) type, a multimedia card micro type, a memory of a card type (for example, an SD or XD memory), a random access memory (RAM), a static random access memory (SRAM), a read only memory (ROM), an electrically erasable programmable read only memory (EEPROM), a programmable read-only memory (PROM), a magnetic memory, a magnetic disk, and an optical disk.

The processor 140 controls the overall operations of the remote control device 100 by using various programs stored in the memory 180 of the remote control device 100. For example, the processor 140 may include a central processing unit (CPU), a RAM, a ROM, and a system bus. The ROM stores a set of instructions for booting a system, and the CPU copies an operating system (O/S) stored in the memory of the remote control device 100 onto the RAM according to an instruction stored in the ROM, executes the O/S and boots the system. When booting is completed, the CPU copies various applications stored in the memory 180 onto the RAM, executes the applications, and performs various operations. Although the processor 140 includes only one CPU in the above-described embodiment, the processor 140 may be implemented by using a plurality of CPUs (or DSP, SoC). The processor 140 may control the display 120 to display a UI including a plurality of UI elements for controlling the external display apparatus 200, based on information on a content received from the external display apparatus 200 and a state of the remote control device 100.

Specifically, the processor 140 may receive information on a content from the external display apparatus 200 through the communication unit 130, and may determine a UI type corresponding to the content which is reproduced on the external display apparatus 200. In addition, the processor 140 may determine arrangements (or display directions) of the UI elements based on the state of the remote control device 100, which is detected through the sensor 110.

Accordingly, the processor 140 may display the UI on the display 120 based on the determined arrangements of the UI elements and the determined UI type.

In particular, the processor 140 may determine whether the remote control device 100 is gripped by the user through the sensor 110. When the remote control device 100 is gripped by the user, the processor 140 may control the display 120 to display the UI.

In addition, when a trigger signal transmitted by the external display apparatus 200 detecting the user is received through the communication unit 130, the processor 140 may activate the microphone 150 in the remote control device 100. In addition, when the above-described trigger signal is received, the processor 140 may activate the LED 160. In this case, when a predetermined time elapses after the trigger signal was received, the processor 140 may inactivate the LED 160.

When the remote control device 100 and the external display apparatus 200 are disconnected from each other, the processor 140 may change a mode of the remote control device 100 to a standby mode. In this case, the standby mode refers to a state in which only some elements (for example, the communication unit, the processor) of the remote control device 100 are activated, and the other elements (for example, the display, the microphone) are inactivated.

In this case, the processor 140 may activate an indicator indicating that the microphone 150 is inactivated on the display 120. The processor 140 may remove the above-described indicator after a predetermined time elapses. According to another embodiment, when a predetermined event occurs, the processor 140 may control to output a voice message stored in the memory 180 through the speaker 170. For example, when an event in which the microphone 150 is activated occurs, the processor 140 may control to output a message saying "Please input your voice." through the speaker 170. FIGS. 5 to 10 are views to illustrate functions of the remote control device 100 according to various embodiments.

Figures 5A, 5B, 5C, 5D:
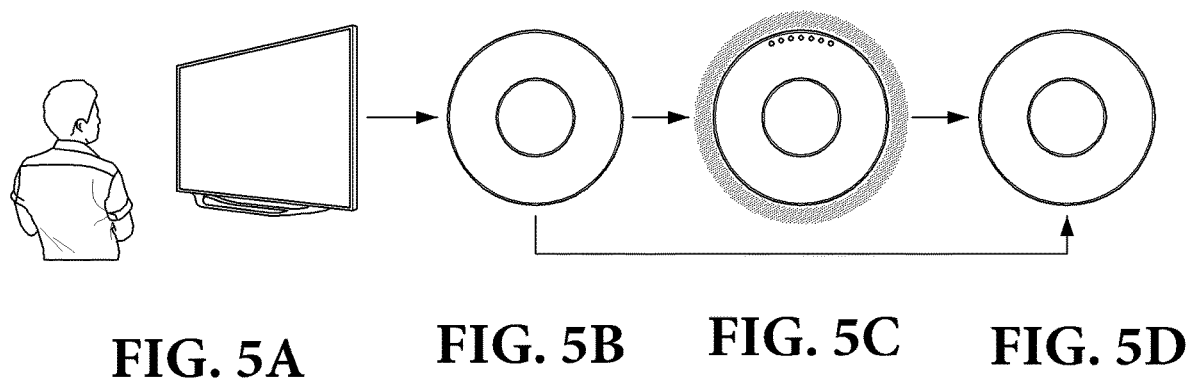

As shown in FIG. 5(a), the external display apparatus 200 may detect a user while the remote control device 100 maintains a standby mode. Herein, the standby mode refers to a state in which only some elements of the remote control device 100 are activated, and the other elements are inactivated. For example, the display and the microphone of the remote control device 100 may be inactivated while the remote control device 100 maintains the standby mode. In another example, while the remote control device 100 maintains the standby mode, the microphone of the remote control device 100 may be inactivated and specific information (for example, time, weather, or the like) may be outputted through the display.

In this case, the external display apparatus 200 may detect the existence of the user by using a proximity sensor, a camera, or the like. When the user is detected, the external display apparatus 200 may transmit a trigger signal to change the state of the remote control device 100 to an active state. In this case, the trigger signal may include not only a control command for activating the remote control device 100, but also information on a content currently displayed on the display apparatus 200. For example, when the content currently displayed by the external display apparatus 200 is a sport content, the external display apparatus 200 may transmit a trigger signal indicating that the type of the currently displayed content is a live TV, and including information on the sport content.

The remote control device 100 may receive the trigger signal from the external display apparatus 200 while maintaining the standby mode as shown in FIG. 5B. When the trigger signal is received, the remote control device 100 may activate the other elements as shown in FIG. 5(c). In particular, the remote control device 100 may activate the display 120 and the microphone 150, and may activate the LED 160 to allow the user to recognize a location of the remote control device 100.

When a predetermined time elapses, the remote control device 100 may inactivate the LED 160 as shown in FIG. 5(d).

When the remote control device 100 maintains the standby mode with the communication unit 130 of the remote control device 100 being disconnected from the external display apparatus 200, the remote control device 100 may still maintain the standby mode as shown in FIG. 5(d) even if the external display apparatus 200 detects the existence of the user nearby.

According to the above-described embodiment, there is an effect that, when the user approaches the external display apparatus 200, the external display apparatus 200 can be controlled only by a voice through the microphone 150. In addition, when there is no user around the external display apparatus 200 or the remote control device 100 is disconnected from the external display apparatus 200, the remote control device 100 may maintain the standby mode and thus there is an effect that unnecessary power consumption can be prevented.

According to another embodiment, even when the display 120 of the remote control device 100 is activated and displays a UI, the external display apparatus 200 may transmit a trigger signal based on detection of a user. In this case, the trigger signal may include not only a control command for activating the remote control device 100, but also information on a content currently displayed by the display apparatus 200. When the trigger signal is received, the remote control device 100 may activate the other elements as shown in FIG. 5(c). In particular, the remote control device 100 may activate the microphone 150, and may inactivate the LED 160 to allow the user to recognize a location of the remote control device 100.

According to another embodiment, when a predetermined event occurs, the remote control device 100 may output a voice message pre-stored in the memory 180 through the speaker 170. For example, when an event in which a trigger signal is received and the remote control device 100 changes from the standby mode to the active mode occurs, the speaker 170 may output a voice message saying "Please enter a command," "You can instruct through your voice," or the like.

According to the above-described embodiment, there is an effect that the user can recognize that the user can control the external display apparatus 200 only by a voice through the microphone 150, and can recognize a location of the remote control device 100.

Figure 6A:
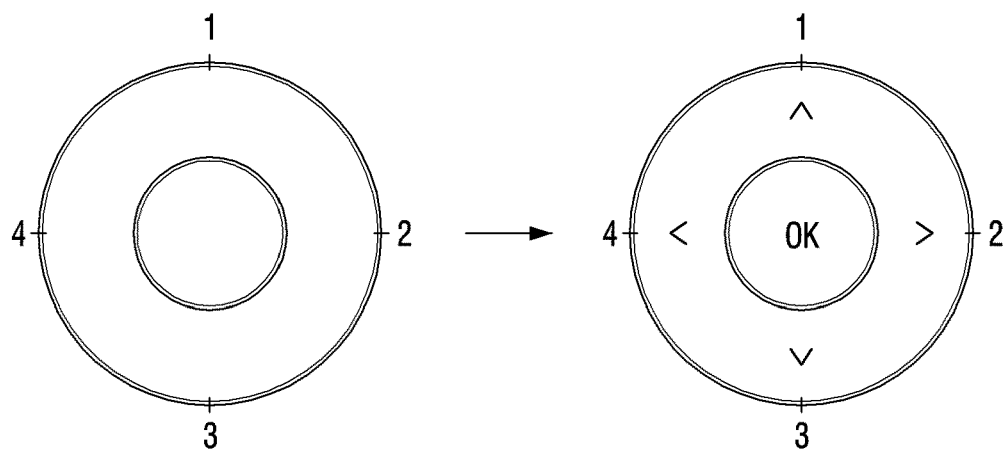
Figure 6B:
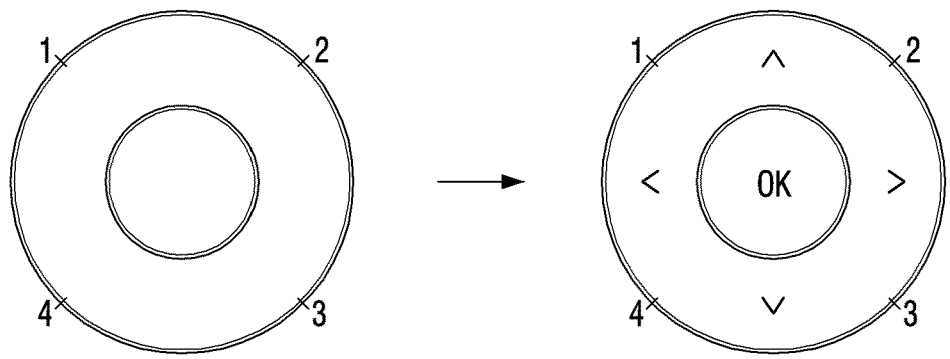
Figure 6C:
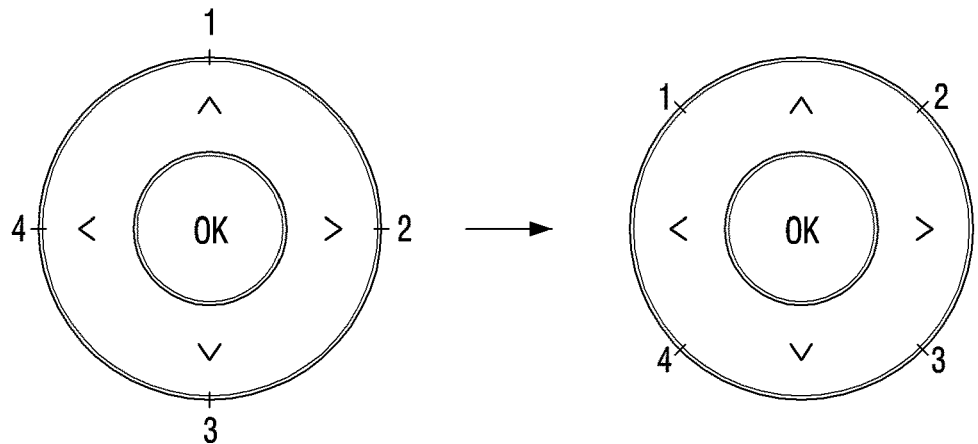

FIG. 6 is views to illustrate an embodiment in which the remote control device 100 determines a direction of a UI including a plurality of UI elements Specifically, the remote control device 100 may detect a state before the remote control device 100 is gripped by a user, and may determine arrangements of the UI elements with reference to the detected state. As shown in FIGS. 6(a) to 6(c), it is assumed that a certain specified portion of the remote control device 100 is referred to as (1), and portions shifted from portion (1) by 90 degrees in the clockwise direction are referred to as (2), (3), and (4), respectively.

Referring to FIG. 6(a), the remote control device 100 is placed with the certain specified portion (1) being positioned relatively higher than the other portions with reference to the surface of the earth. The sensor 110 may detect that the specified portion (1) of the remote control device 100 is positioned relatively higher than the other portions with reference to the surface of the earth, and the processor 140 may determine the specified portion (1) as an upper end of the remote control device 100 based on information detected by the sensor 110. The processor 140 may determine that the remote control device 100 is placed with the upper end of the remote control device 100 being positioned relatively higher than the other portions with reference to the surface of the earth, and may determine arrangements of the UI elements, such that the upper end of the UI including the plurality of UI elements corresponds to the upper end of the remote control device 100.

Referring to FIG. 6(b), the remote control device 100 is placed with an intermediate portion between the certain specified portion (1) and the specified portion (2) being positioned relatively higher than the other portions with reference to the surface of the earth. The sensor 110 may detect that the intermediate portion between the specified portion (1) and the specified portion (2) of the remote control device 100 is positioned relatively higher than the other portions with reference to the surface of the earth, and the processor 140 may determine the intermediate portion between the specified portion (1) and the specified portion (2) as an upper end of the remote control device 100 based on information detected by the sensor 110. The processor 140 may determine that the remote control device 100 is placed with the upper end of the remote control device 100 being positioned relatively higher than the other portions with reference to the surface of the earth, and may determine arrangements of the UI elements, such that the upper end of the UI including the plurality of UI elements corresponds to the upper end of the remote control device 100.

According to the above-described embodiment, the remote control device 100 may provide a UI which is arranged in a normal direction to the user, regardless of which portion of the remote control device 100 is positioned relatively higher than the other portions with reference to the surface of the earth before the remote control device 100 is gripped by a user.

In addition, by determining arrangements of the UI elements to correspond to a state of the remote control device 100 before the remote control device 100 is gripped by a user, problems that arise when arrangements of UI elements are determined to correspond to a posture of a user gripping the remote control device 100 can be solved.

For example, if the processor 140 determines arrangements of the UI elements to correspond to a state of the remote control device 100 when a user grips the remote control device 100, the remote control device 100 may provide a UI including UI elements arranged in the reverse direction from the user when the user lies on user's back or front.

On the other hand, according to the above-described embodiment, the processor 140 may already arrange the UI elements in the normal direction from the user before the user grips the remote control device 100, and accordingly, the remote control device 100 may provide the UI including the UI elements arranged in the normal direction regardless of user's posture even after the user grips the remote control device 100.

Referring to FIG. 6(c), the remote control device 100 is gripped by the user with the certain specified portion (1) being positioned relatively higher than the other portions with reference to the surface of the earth. The sensor 110 may detect that the specified portion (1) of the remote control device 100 is positioned relatively higher than the other portions with reference to the surface of the earth, and the processor 140 may determine the specified portion (1) as the upper end of the remote control device 100, based on information detected by the sensor 110. Accordingly, the processor 140 may determine arrangements of the UI elements, such that the upper end of the remote control device 100 and the upper end of the UI including the plurality of UI elements correspond to each other.

In this case, when the state of the remote control device 100 is changed by the user to a state in which the intermediate portion between the certain specified portion (1) and the specified portion (2) is positioned relatively higher than the other portions with reference to the surface of the earth, the processor 140 may determine the intermediate portion between the specified portion (1) and the specified portion (2) as the upper end of the remote control device 100, based on information detected by the sensor 110. Accordingly, the processor 140 may determine arrangements of the UI elements, such that the upper end of the remote control device 100 and the upper end of the UI including the plurality of UI elements correspond to each other.

That is, even when the remote control device 100 is gripped by the user and changes its orientation direction and its angle with respect to the surface of the earth, the processor 140 may determine the portion relatively higher than the other portions with reference to the surface of the earth as the upper end of the remote control device 100 through the sensor 110 on a real time basis. Accordingly, the processor 140 may determine arrangements of the UI elements on a real time basis, such that the upper end of the remote control device 100 and the upper end of the UI including the plurality of UI elements correspond to each other.

In the above-described embodiment, arrangements of the UI elements are determined to correspond to the direction of the upper end of the remote control device 100, and the UI is displayed. However, the present disclosure is not limited to the above-described embodiment, and arrangements of the UI elements may be determined in various ways. FIG. 7 is view to illustrate an embodiment in which a UI including a plurality of UI elements is displayed on the display 120 of the remote control device 100

Specifically, when the remote control device 100 is gripped by a user, the remote control device 100 may display a UI including a plurality of UI elements.

Figure 7A:
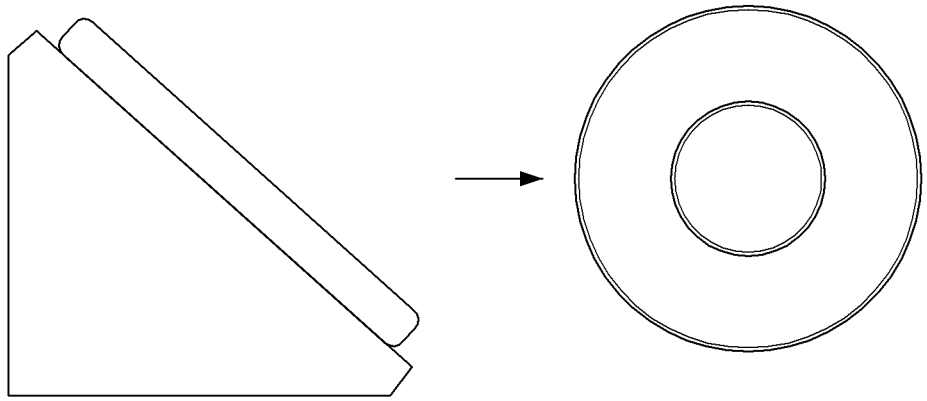

Referring to FIG. 7(a), the remote control device 100 is placed on a holder without movement before being gripped by a user. In this case, the sensor 110 may detect that the remote control device 100 does not move. Accordingly, the processor 140 may determine that the remote control device 100 is not gripped by a user, and the remote control device 100 may maintain a standby mode state and may not display a UI.

Figure 7B:
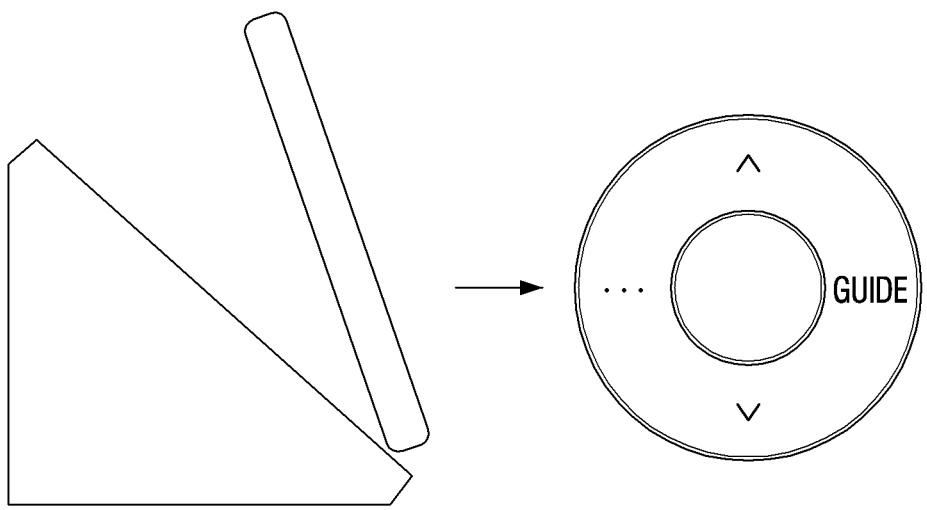

Referring to FIG. 7(b), the remote control device 100 is gripped by a user and moves. In this case, the sensor 110 may detect that the state of the remote control device 100 is changed, and may detect a movement of the remote control device 100. Accordingly, the processor 140 may determine that the remote control device 100 is gripped by the user, and the remote control device 100 may be activated and may display a UI. In this case, the remote control device 100 may determine a portion positioned higher than the other portions with reference to the surface of the earth, as an upper end of the remote control device 100, and may arrange UI elements, such that the upper end of the UI including the plurality of UI elements corresponds to the upper end of the remote control device 100.

According to the above-described embodiment, the remote control device 100 may maintain the display 120 in an inactive state when not being gripped by the user, and may activate the display 120 only when being really used by the user, such that unnecessary power consumption can be minimized Even when the microphone 150 of the remote control device 100 is activated, the sensor 110 may detect a movement of the remote control device 100. Accordingly, the processor 140 may determine that the remote control device 100 is gripped by the user, and the remote control device 100 may activate the display 120 and may display the UI.

According to another embodiment, when a predetermined event occurs in the remote control device 100, the processor 140 may output a voice message pre-stored in the memory 180 through the speaker 170. For example, when an event in which the remote control device 100 displays a UI occurs, the speaker 170 may output a voice message saying "Hello. Please enter a command" The message pre-stored in the memory 180 is not limited to the above-described example.

Accordingly, the user may recognize that the user approaches the external display apparatus 200 and can control the external display apparatus 200 only by a voice through the microphone 150, and may recognize a location of the remote control device 100.

FIG. 8 is a view to illustrate an embodiment in which a UI including a plurality of UI elements is displayed on the display 120 of the remote control device 100.

Specifically, the processor 140 may determine a type of a UI to be displayed on the display 120 of the remote control device 100 according to information on a content currently reproduced on the external display apparatus 200. Referring to FIG. 8, when the current content reproduced on the external display apparatus 200 is a live TV, a menu screen/APP, VOD, or a speaker/sound device, the processor 140 may display UIs of various forms corresponding to the respective contents on the display 120.

The external display apparatus 200 may transmit type information and identification information of the content currently reproduced to the communication unit 130 of the remote control device 100. Herein, the type information of the content refers to information regarding a specific type among various content types such as VOD, a speaker, an APP, or the like, and the identification information refers to information regarding a title, a provider, or the like of the corresponding content.

When the content information is received through the communication unit 130, the processor 140 may determine a UI corresponding to the content information from among UI types pre-stored in the memory 180. For example, when the content currently reproduced on the external display apparatus 200 is the menu screen/APP, the external display apparatus 200 may transmit content type information and content identification information regarding the menu screen/APP, which is the currently reproduced content, to the remote control device 100. When the content type information and the content identification information of the menu screen/APP are received, the remote control device 100 may display a UI including four-direction UI elements mapped onto functions for controlling the menu screen/APP. In the above-described embodiment, the UIs stored in the memory 180 are not limited to the UI types illustrated in FIG. 8, and may have various forms. FIG. 9 is view to illustrate an embodiment of a method for displaying a UI and an indicator of the remote control device 100.

Specifically, when the external display apparatus 200 and the remote control device 100 are disconnected from each other, the remote control device 100 may maintain the standby mode and may display an indicator indicating that the microphone 150 cannot be used.

Figures 9A, 9B, 9C:
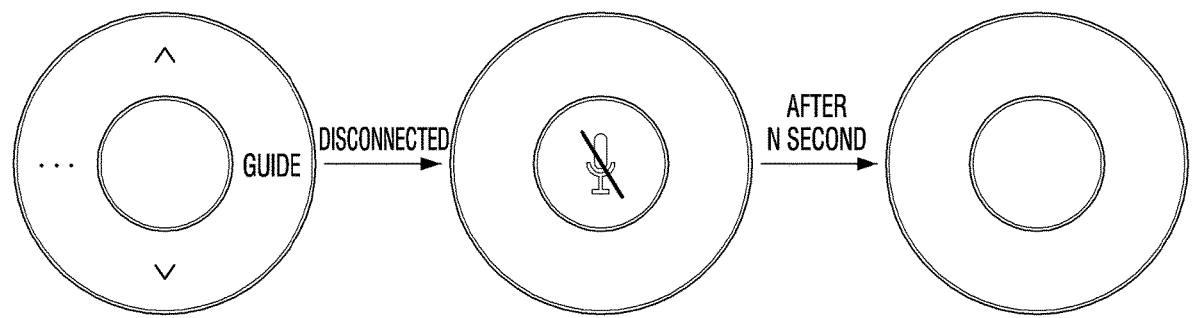

Referring to FIG. 9, FIG. 9(a) illustrates a state in which the microphone 150 and the display 120 of the remote control device 100 are activated. The display 120 may display a UI corresponding to information on a content currently reproduced on the external display apparatus 200.

FIG. 9(b) illustrates a state in which the external display apparatus 200 and the remote control device 100 are disconnected from each other. For example, the remote control device 100 may exist in a different space from that of the external display apparatus 200, and thus communication between the communication units may be disconnected. In this case, the remote control device 100 changes its mode to the standby mode, and may also display an indicator indicating that the microphone 150 cannot be used.

Referring to FIG. 9(c), after a predetermined time (N second) elapses after the external display apparatus 200 and the remote control device 100 were disconnected from each other, the remote control device 100 may remove the indicator indicating that the microphone 150 cannot be used, and may maintain the standby mode.

Even in the case where the user approaches the external display apparatus 200 and thus the microphone 150 of the remote control device 100 is activated, but the user does not grip the remote control device 100 and thus the display 120 is in the inactive state, when the remote control device 100 and the external display apparatus 200 are disconnected from each other, the remote control device 100 may maintain the standby mode, and may display the indicator indicating that the microphone 150 cannot be used.

According to the above-described embodiment, when the user cannot control the remote control device 100 since the external display apparatus 200 and the remote control device 100 are disconnected from each other, the remote control device 100 maintains the standby mode and thus can prevent unnecessary power consumption.

According to the above-described embodiment, there is an effect that the user can recognize that the external display apparatus 200 and the remote control device 100 are disconnected from each other, through the indicator indicating that the microphone 150 cannot be used.

According to another embodiment, when a predetermined event occurs, the remote control device 100 may output a voice message pre-stored in the memory 180 through the speaker 170. For example, when an event in which the external display apparatus 200 and the remote control device 100 are disconnected from each other occurs, the speaker 170 may output a voice message saying "Disconnected." or "Cannot input a voice." The voice message pre-stored in the memory 180 is not limited to the above-described examples.

FIG. 10 is views to illustrate a shape of the remote control device 100 according to various embodiments.

Specifically, FIG. 10 is front views, perspective views, and side views of the remote control device 100 from the left.

Figure 10A:
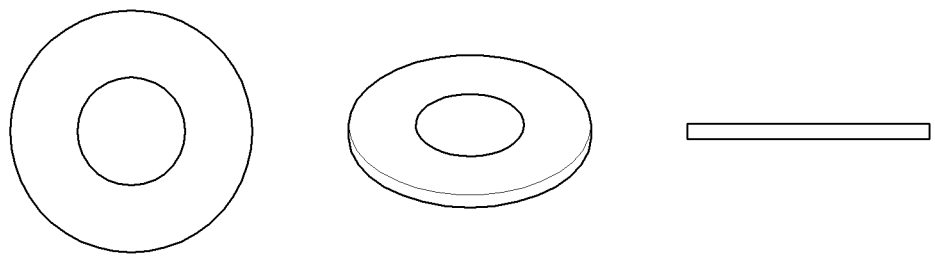
Figure 10B:
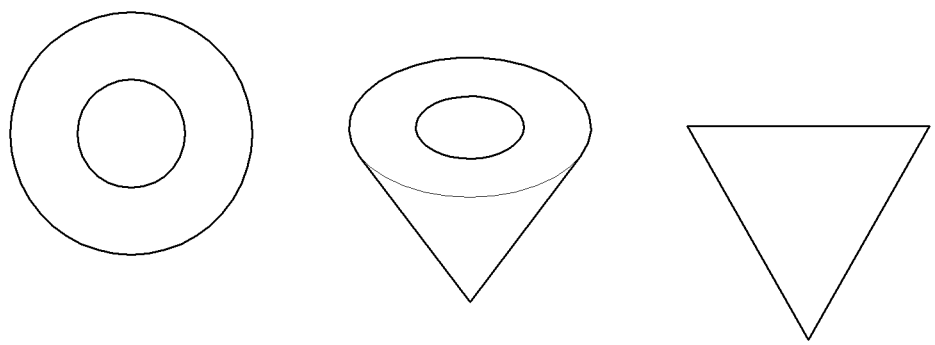
Figure 10C:
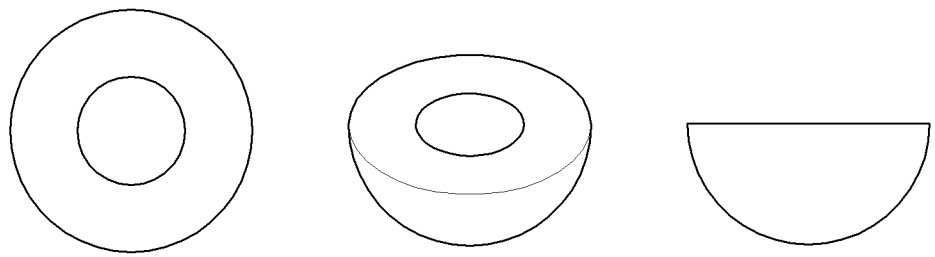

Referring to FIG. 10(a), the remote control device 100 is formed in a cylindrical shape, and the display 120 is positioned on a bottom surface of the cylinder. Referring to FIG. 10(b), the remote control device 100 is formed in a conical shape, and the display 120 is positioned on a bottom surface of the cone. Referring to FIG. 10(c), the remote control device 100 is formed in a hemispherical shape, and the display 120 is positioned on a bottom surface of the hemisphere.

The shape of the remote control device 100 are not limited to the above-described examples, and may be various.

Figure 11:
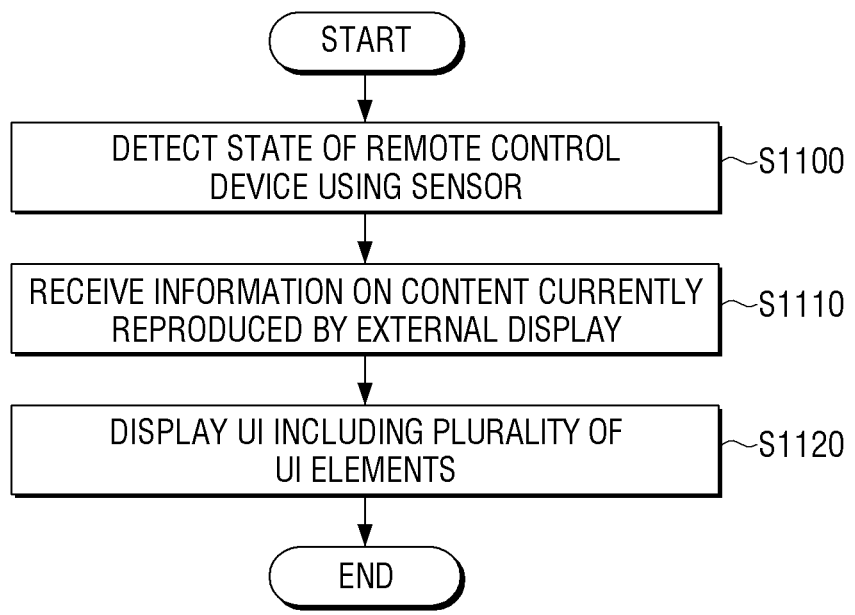
FIG. 11 is a view to illustrate a control flow of the remote control device according to various embodiments.

FIG. 11 is a view illustrating a control flow of the remote control device 100 according to an embodiment.

Referring to FIG. 11, the remote control device 100 may determine a state of the remote control device 100 by using the sensor 110 (S1100), and may determine arrangements of a plurality of UI elements to correspond to the determined state. The remote control device 100 may receive information on a content currently reproduced by the external display apparatus 200 through the communication unit 130 (S1110), and may determine a type of a UI to be displayed on the display 120 according to the received information. The remote control device 100 may determine a UI including a plurality of UI elements, based on the state of the remote control device 100 and the information on the content currently reproduced by the external display apparatus 200, and may display the UI on the display 120 (S1120).

According to another embodiment, the order of steps S1100 and S1110 in the above-described embodiment may be changed. For example, the remote control device 100 may receive the information on the content currently reproduced by the external display apparatus 200 through the communication unit 130 (S1110), and may determine the type of the UI to be displayed on the display 120 according to the received information. Thereafter, the remote control device 100 may detect the state of the remote control device 100 by using the sensor 110 (S1100), and may determine arrangements of the plurality of UI elements to be displayed on the display 120 to correspond to the detected state. The remote control device 100 may display the UI including the plurality of UI elements on the display 120, based on the state of the remote control device 100 and the information on the content currently reproduced by the external display apparatus 200 (S1120).

The present disclosure is not limited to the above-described embodiment, and may include various control flows.

Figure 12:
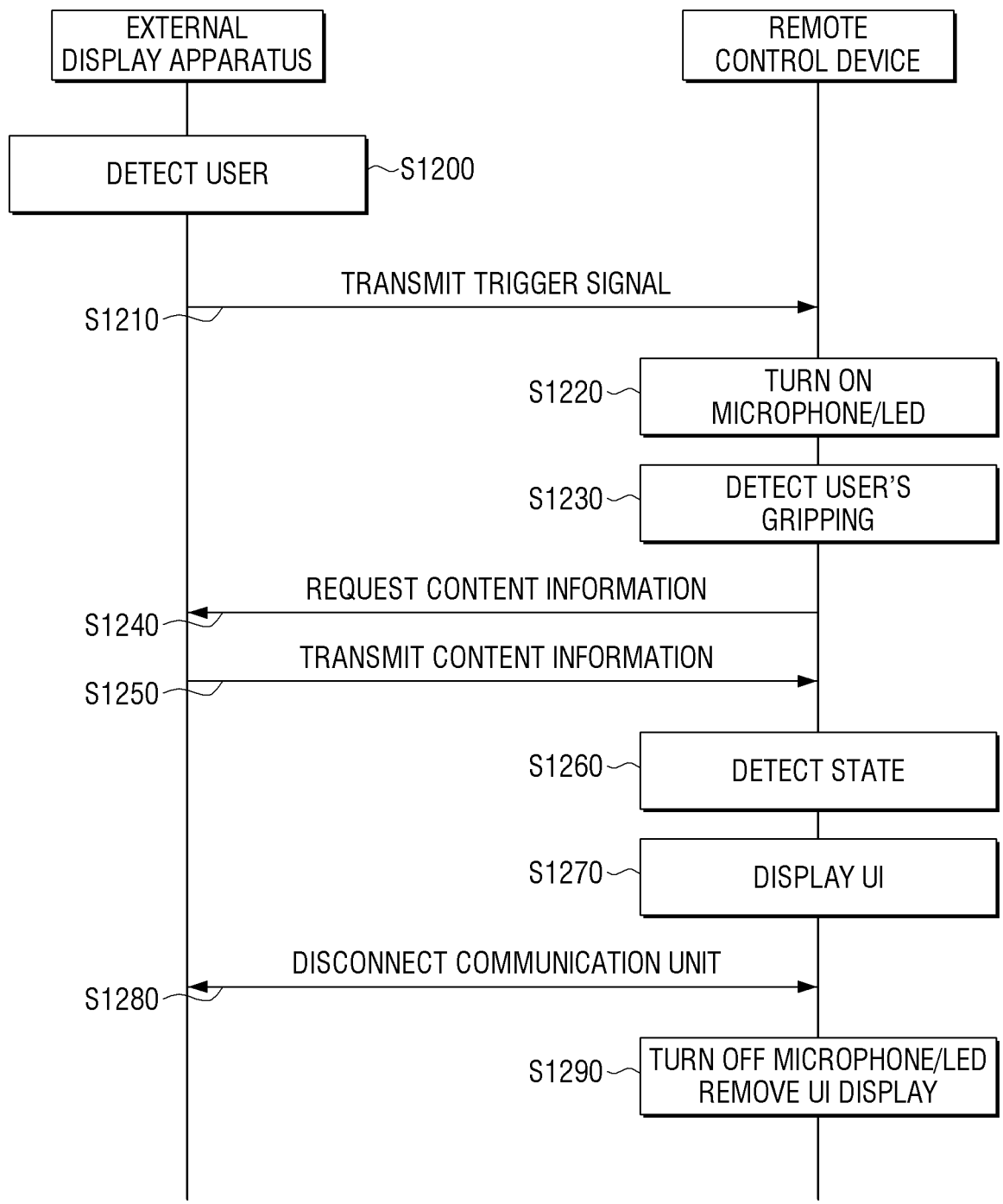
FIG. 12 is a view to illustrate an operating process of the remote control device according to various embodiments.

FIG. 12 is a view to illustrate an operating process of the remote control device 100 according to an embodiment.

Specifically, the external display apparatus 200 may detect existence of a user nearby (S1200). The external display apparatus 200 may transmit corresponding detection information to the remote control device 100 as a trigger signal (S1210). The remote control device 100 may activate the microphone 150 and the LED 160 through the received trigger signal (S1220). When the remote control device 100 detects a user grip through the sensor 110 (S1230), the remote control device 100 may request content information from the external display apparatus 200 (S1240), and the external display apparatus 200 may transmit the content information in response to this request (S1250). The remote control device 100 may detect a state of the remote control device 100 through the sensor 110 (S1260). The remote control device 100 may display a UI on the display 120 based on the received content information and the detected state (S1270). When connection of the communication units between the external display apparatus 20 and the remote control device 100 is disconnected (S1280), the remote control device 100 may inactivate the microphone 150 and the LED 160 of the remote control device 100, and may remove the display of the UI from the display 120.

In this case, the order of the trigger signal transmission and the microphone/LED activation (S1210, S1220), the user grip detection (S1230), the content information transmission and reception (S1240, 1250), and the state detection (S1260) may be changed.

In other embodiments, the operating process of the remote control device 100 may be implemented in various forms.

Figure 13:
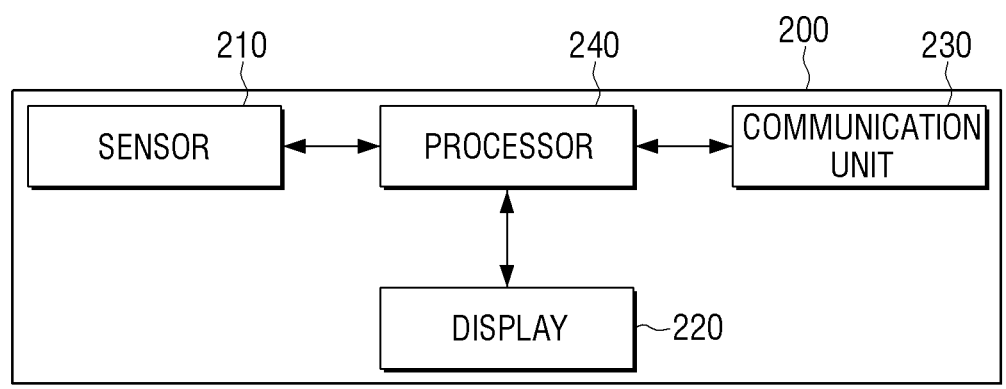
FIG. 13 is a block diagram illustrating a configuration of the external display apparatus according to an embodiment.

FIG. 13 is a block diagram to illustrate a configuration of the external display apparatus 200 according to an embodiment.

Referring to FIG. 13, the external display apparatus 200 may include a sensor 210, a display 220, a communication unit 230, and a processor 240.

The sensor 210 may detect that a user approaches the periphery of the external display apparatus 200.

The display 220 may display a content currently reproduced by the external display apparatus 200. In this case, the display 220 may display a current date, time.

The display 220 may be implemented by using an LCD, for example, and according to circumstances, may be implemented by using a CRT, a PDP, OLEDs, TOLEDs, or the like. In addition, the display 220 may be implemented in the form of a touch screen capable of detecting a user's touch operation.

The communication unit 230 may be configured to be connected with the communication unit 130 of the remote control device 100 and to communicate therewith. In particular, the communication unit 230 may transmit information to be transmitted to the remote control device 100. In this case, the transmitted information may be received in various forms such as an IR signal or a Bluetooth signal.

The information transmitted from the external display apparatus 200 described above may be type information or identification information of the content currently reproduced by the external display apparatus 200. In addition, the transmitted information may be a trigger signal which is generated by the external display apparatus 200 detecting the existence of a user on the periphery of the external display apparatus 200 through the sensor 210.

In addition, the communication unit 230 may include various communication chips for supporting wired or wireless communication. For example, the communication unit 230 may include various communication chips such as a WiFi chip, a Bluetooth chip, a wireless communication chip, or the like. The WiFi chip and the Bluetooth chip communicate in a WiFi method and a Bluetooth method, respectively. The wireless communication chip refers to a chip which communicates according to various communication standards such as IEEE, Zigbee, 3G, 3GPP, LTE, and the like. In addition, the communication unit 230 may further include an NFC chip operating in an NFC method.

The processor 240 may be configured to control the overall operation of the external display apparatus 200.

According to an embodiment, the processor 240 may control to transmit detection information indicating the existence of the user nearby, that is, the trigger signal, to the remote control device 100 from the sensor 210 through the communication unit 230.

According to another embodiment, the processor 240 may transmit type information and identification information of a content currently reproduced by the external display apparatus 200 to the communication unit 130 through the communication unit 230. Herein, the type information of the content refers to, for example, information on a specific type from among various content types such as VOD, a speaker, an APP, or the like, and the identification information refers to information regarding a title, a provider, or the like of the corresponding content.

The apparatus (for example, the display 120) or method (for example, operations) according to various embodiments may be performed by at least one computer (for example, a processor) which executes instructions included in at least one program from among programs which are maintained in a computer-readable storage medium.

When the instructions are executed by a computer (for example, a processor), the at least one computer may perform a function corresponding to the instructions. In this case, the computer-readable storage medium may be the memory 180, for example.

The program may be included in a computer-readable storage medium such as a hard disk, a floppy disk, magnetic medium (for example, a magnetic tape), optical media (for example, a compact-disc read only memory (CD-ROM), a digital versatile disc (DVD), a magneto-optical media (for example, a floptical disk)), a hardware device (for example, a read only memory (ROM), a random access memory (RAM), or a flash memory), etc. In this case, the storage medium may be included as a part of a configuration of the remote control device 100, but may be mounted through a port of the remote control device 100 or may be included in an external device (for example, a cloud, a server, or another electronic device) located outside the remote control device 100. In addition, the program may be stored in a plurality of storage media separately. In this case, at least part of the plurality of storage media may be located in an external device of the remote control device 100. The instructions may include machine language codes created by a compiler, and high-level language codes that can be executed by a computer by using an interpreter. The above-described hardware device may be configured to operate as one or more software modules to perform the operations according to various exemplary embodiments, and vice versa.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for displaying a UI of a remote control device for controlling an external display apparatus, the method comprising:
receiving information on a content currently displayed by the external display apparatus from the external display apparatus;
detecting a state of the remote control device; and
displaying a UI including a plurality of UI elements for controlling the external display apparatus, based on the information on the content and the state of the remote control device,
wherein the detecting comprises recognizing an upper end of the remote control device based on the state of the remote control device; and
wherein the displaying of the UI comprises determining arrangements of the UI elements with reference to the upper end of the remote control device and displaying the UI.

2. The method of claim 1, wherein the receiving of the information comprises receiving at least one of type information of the content currently displayed by the external display apparatus, or identification information of the content.

3. The method of claim 2, wherein the displaying of the UI comprises determining a plurality of UI elements corresponding to the type information on the content, and displaying a UI including the determined plurality of UI elements.

4. The method of claim 1, wherein the displaying of the UI comprises determining arrangements of the UI elements to correspond to the detected state of the remote control device, and displaying the UI.

5. The method of claim 4, wherein the detecting further comprises recognizing an upper end of the remote control device before the remote control device is gripped by a user.

6. The method of claim 5, wherein the displaying of the UI comprises displaying the UI, based on detecting that the remote control device is gripped by the user.

7. The method of claim 5, wherein the detecting comprises recognizing an upper end of the remote control device on a real time basis, according to a state of the remote control device which changes after the remote control device is gripped by the user.

8. The method of claim 1, further comprising:
while the microphone of the remote control device is inactivated, when the external display apparatus detects existence of a user, the external display apparatus transmits a trigger signal to the remote control device; and
in response to the trigger signal being received by the remote control device, the microphone is activated.

9. The method of claim 8, further comprising:
activating an LED in response to the trigger signal; and
inactivating the LED when a predetermined time elapses after the trigger signal is received.

10. The method of claim 8, further comprising, based on communication between the remote control device and the external display apparatus being disconnected, removing the plurality of UI elements, and displaying an indicator indicating an inactive state of the microphone.

11. The method of claim 1, wherein the state of the remote control device comprises at least one of an angle of the remote control device formed with respect to the surface of the earth, or a direction toward which the remote control device faces.

12. A remote control device for controlling an external display apparatus, the remote control device comprising:
a communication unit configured to communicate with the external display apparatus;
a sensor configured to detect a state of the remote control device;
a display; and
a processor configured to receive information on a content currently displayed by the external display apparatus through the communication unit, and to control the display to display a UI including a plurality of UI elements for controlling the external display apparatus, based on the information on the content and the state of the remote control device, and
wherein the processor is configured to recognize an upper end of the remote control device based on the state of the remote control device using the sensor; and
determine arrangements of the UI elements with reference to the upper end of the remote control device and control the display to display the UI.

13. The remote control device of claim 12, wherein the communication unit is configured to receive at least one of type information of the content currently displayed by the external display apparatus, or identification information of the content.

14. The remote control device of claim 13, wherein the processor is configured to determine a plurality of UI elements corresponding to the type information on the content, and to control to display a UI including the determined plurality of UI elements on the display.

15. The remote control device of claim 12, wherein the processor is configured to determine arrangements of the UI elements to correspond to the state of the remote control device detected through the sensor, and to control to display the UI on the display.

* * * * *